United States Patent Office 2,825,648
Patented Mar. 4, 1958

2,825,648
PRESERVED FISH FOOD
Harold A. Corbett, Longueuil, Quebec, Canada
No Drawing. Application February 1, 1956
Serial No. 562,910
4 Claims. (Cl. 99—3)

This invention relates to improvements in food preparations for fish.

A particular object of this invention is to provide a means for supplying feed for fish in a bowl or aquarium over an extended period of time when it is desirable or necessary to take a trip or vacation without having to provide for an attendant to feed the fish at regular intervals during one's absence.

Heretofore, people with aquariums stocked with fish have been faced with the problem of providing their fish with nourishment during their absence. For example, if one intended to take a two weeks' vacation, the type of prepared fish food available could not be deposited in the aquarium in quantities which would suffice for the nourishment of the fish for two weeks. Such food would spoil in the water if left in a soaked condition for any appreciable period and cause a contamination which made it impossible for the fish to survive. Therefore, it became necessary to rely upon a regular attendant to look after the feeding of the fish during the owner's absence. Very often such an arrangement was inconvenient and unreliable.

In order to solve this problem it is proposed to provide a medium for storing a fish food in such a manner that slow dissolution of the medium releases food in small quantities sufficient for daily sustenance of the fish over an extended period.

The objects and advantages of my invention will be understood more readily from the following detailed explanation, which is accompanied by illustrative formulas for the preparation of the product.

To provide for the gradual release of food particles in water it was necessary to find a medium which would dissolve at a slow rate in water and, in so doing, would not itself cause contamination or otherwise be harmful to the fish. This medium also had to have the property of a preservative for the food contained therein. After careful experimentation it was discovered that plaster of Paris, when formed into cakes, would dissolve sufficiently slowly into the water of an aquarium without leaving harmful deposits and without having any apparent effect on the fish.

The next problem was to find a suitable food product and to process the same to prevent its contamination. Experiments proved that dried meal of fish, shrimp or lobster meat, if properly stored or packaged, would remain for extended periods without increasing its bacteria count and would under certain conditions retain its food values while encased in plaster of Paris.

A mixture of dried fish meal (shredded shrimp, fish or lobster), plaster of Paris and water in the following proportions was ultimately arrived at:

Fish meal_____ 2 to 3½ oz.
Plaster of Paris_____ 2 lbs.
Water_____ 24 oz. (approximately).

The plaster of Paris and water were first mixed to form a thickened mass, the fish meal was then stirred into the mass so as to be distributed throughout. The resulting mix was poured into moulds and left to set, then removed from the moulds and allowed to thoroughly dry. Experiments proved that drying temperatures of between 70° to 100° F. produced the best results, particularly in the absence of substantial humidity in the atmosphere. For example, under conditions of high atmospheric humidity the core of the moulded product remained moist for an excessive period resulting in rot of the meal. The same condition prevails at temperatures below approximately 70° F. On the other hand temperatures above 100° F. (approximately) result in an increase in the bacteria count of the meal, particularly in the presence of moisture, and contamination results therefrom.

The thoroughly dried block or mould is then packed in moisture proof packing for distribution and storage. A block, when placed in an aquarium will cause small quantities of the meal to be released by a process of gradual disintegration of the plaster of Paris from the outer surface towards the core. During this process of gradual disintegration and dissolution it appears that the interior, if properly predried, does not absorb moisture. Thus a block of the above proportions will continue to dissolve for approximately two weeks, releasing the food particles at its surface and at the same time protecting the encased food particles from rot so that, when ultimately released, it will not contaminate the aquarium.

While the above proportions are found to be suitable for dispensing fish meal for a period of about two weeks, other proportions may be mixed together when the period of feeding is to be greater or less than two weeks. Thus, for example, an increased quantity of plaster of Paris and a proportionate increase in the amount of water will extend the period of dissolution of the block and release of the meal. Under such conditions it may be necessary to insert more than one block to ensure that a sufficient amount of meal is released to meet the daily requirements of the fish in the aquarium.

Alternately, the quantity of meal may be increased or the proportions of plaster of Paris and water may be decreased so that the dissolution of the block and release of the meal will be more rapid. However, care must be exercised to ensure that the proportion of plaster of Paris is sufficient to maintain the unreleased portions of the meal in a preserved state.

The block that is prepared for a two weeks' supply is perhaps the most satisfactory since it will give food supplies for all periods up to two weeks as well as ensuring preservation of the unreleased meal.

What I claim is:

1. A method of preparing a food product for fish which comprises mixing approximately 2 lbs. of plaster of Paris with approximately 24 oz. of water to form a thickened plastic mass, distributing from 2 to 3½ oz. of fish meal particles throughout the plastic mass and then subjecting the resulting mixture to a drying out process calculated to prevent spoilage of the meal so as to form a solidified mass in which the meal is maintained in a preserved state.

2. A method according to claim 1, in which the drying out process is effected at a temperature from 70° to 100° F.

3. A fish food product comprising a block containing a fish meal distributed throughout a mass of solidified plaster of Paris in a preserved condition so that gradual dissolution of the plaster of Paris in water releases small quantities of the meal from said block.

4. A fish food product comprising a block containing 2 to 3½ oz. of fish meal evenly distributed throughout a mass of approximately 2 lbs. of solidified plaster of Paris, in a preserved condition, so that gradual dissolution of the plaster of Paris in water releases small quantities of the fish meal from said block.

References Cited in the file of this patent
UNITED STATES PATENTS
1,204,551    Edgerton _____ Nov. 14, 1916